(12) United States Patent
Mezaki et al.

(10) Patent No.: US 6,393,858 B1
(45) Date of Patent: May 28, 2002

(54) REFRIGERATION SYSTEM

(75) Inventors: Takenori Mezaki; Akitoshi Ueno, both of Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,794

(22) PCT Filed: Jul. 22, 1999

(86) PCT No.: PCT/JP99/03918

§ 371 (c)(1),
(2), (4) Date: Jan. 19, 2001

(87) PCT Pub. No.: WO00/05542

PCT Pub. Date: Feb. 3, 2000

(51) Int. Cl.$^7$ .................................................. F25B 7/00
(52) U.S. Cl. ......................................... 62/335; 62/278
(58) Field of Search .......................... 62/246, 278, 335, 62/151, 175, 506

(56) References Cited

U.S. PATENT DOCUMENTS 6,131,401 A * 10/2000 Ueno et al. .................... 62/335

FOREIGN PATENT DOCUMENTS

| JP | 62-94785 | 5/1987 |
| WO | 98/45651 | 10/1998 |

* cited by examiner

*Primary Examiner*—Henry Bennett
*Assistant Examiner*—Mohammad M Ali
(74) *Attorney, Agent, or Firm*—Nixon Peabody LLP; Donald R. Studebaker

(57) ABSTRACT

It includes a heat source side refrigerant circuit (70) having a plurality of refrigerant heat exchangers (50, 60), and a plurality of user-side refrigerant circuits (11, 21). A high pressure gas pipe (LG-H) is connected to the discharge side of outdoor compressors (41, 42) of the heat source side refrigerant circuit (70), a low pressure gas pipe (LG-L) to the suction side of the outdoor compressors (41, 42), and a liquid pipe (LL) to the liquid side of outdoor heat source side heat exchangers (45, 46). The liquid pipe (LL) is connected to one end side of each refrigerant heat exchanger (50, 60). The other end side of the respective refrigerant heat exchangers (50, 60) can be switched by three-way valves (52, 62) between a state where it is communicated to the high pressure gas pipe (LG-H) and another state where it is communicated to the low pressure gas pipe (LG-L). The liquid pipe (LL) is connected to one end side of a user-side heat exchanger (31) of the heat source side refrigerant circuit (70). The other end side of the user-side heat exchanger (31) can be switched by a three-way valve (33) between a state where it is communicated to the high pressure gas pipe (LG-H) and another state where it is communicated to the low pressure gas pipe (LG-L).

8 Claims, 7 Drawing Sheets

REFRIGERATION SYSTEM

TECHNICAL FIELD

The present invention relates to a refrigeration system. Particularly, the present invention relates to an improvement of a refrigeration system which is provided in facilities which require a plurality of types of temperature environment, for example, a supermarket, or the like.

BACKGROUND ART

Refrigerated showcases which are provided in a supermarket, or the like, are known in the prior art. A showcase of this type is disclosed in, for example, Japanese Laid-Open Patent Publication No. 62-94785. The showcase includes a refrigerant circuit which is comprised of a compressor, a condenser, an expansion valve and an evaporator which are connected together by a refrigerant pipe. The show case also includes a food display space and an air passageway for producing a cold air.

The evaporator is arranged in the air passageway. A refrigerant which has been discharged from the compressor and condensed in the condenser is depressurized through the expansion valve, and then evaporated by the evaporator while exchanging heat with the air in the air passageway, thereby cooling the air. The cooled air is supplied from the air passageway to the display space to keep the food at a predetermined low temperature. Thus, the freshness of the food is maintained.

The inventors of the present invention have also proposed a refrigeration system which realizes the production of a cold air in a plurality of showcases and general air conditioning in a supermarket store, etc., with a single refrigerating system (Japanese Patent Application No. 9-89164).

The refrigeration system includes a plurality of showcases and an air conditioner for general air conditioning which are connected to a single heat source side unit in parallel to one another. The heat source side unit and each showcase are provided as a secondary refrigerant system. Thus, the above refrigeration system includes a heat source side refrigerant circuit which is comprised of a vapor compression type refrigerating cycle. Each showcase is provided with a user-side refrigerant circuit having a refrigerant heat exchanger for exchanging heat with a refrigerant of the heat source side refrigerant circuit. On the other hand, an evaporator of the heat source side refrigerant circuit is arranged in the general air conditioned room.

Thus, in each showcase, a cold heat of a relatively low temperature (for example, −20° C.) is obtained, whereby the freshness of the food can be maintained. On the other hand, in the general air conditioned room, a cold heat of a temperature higher than that in the showcase (for example, 25° C.) is obtained, whereby the inside of the store can be cooled.

PROBLEMS TO BE SOLVED

The present inventors conducted an in-depth study on how to improve the practicability of a refrigeration system as described above which realizes the production of a cold air in a plurality of showcases with a single refrigerating system. The operations required by each individual showcase include those shown below, and the present inventors gave consideration on how to accommodate those operations with a single refrigerating system.

Specifically, the operations required for a showcase include not only the cooling of the air in the showcase but also a defrost operation for melting frost which is performed when the evaporator is frosted. In the prior art, an electric heater is attached to the evaporator, and the defrosting of the showcase is performed by powering the electric heater.

However, in terms of the energy saving property, so-called "hot gas defrosting", wherein a refrigerant discharged from the compressor is supplied to the evaporator, is preferred over the defrosting with the electric heater. As described above, each individual showcase may require a cold heat in some cases or may require a hot heat in other cases.

However, where some showcases require a cold heat while the other showcases require a hot heat, these requirements could not be satisfied with prior art circuit configurations.

The present invention has an objective of providing a refrigeration system for performing a so-called "multi-stage cascade refrigerating cycle" as described above, wherein when a plurality of user-side units individually require a hot heat and a cold heat, these requirements can be accommodated with a single refrigerating system.

DISCLOSURE OF THE INVENTION

In order to achieve the above-described object, the first solution includes a plurality of refrigerant heat exchangers for exchanging heat between a heat source side refrigerant and a user-side refrigerant of a multi-stage cascade refrigerating cycle. Each individual refrigerant heat exchanger can be selectively communicated to a high pressure gas pipe, a low pressure gas pipe and a liquid pipe. By selecting the communication state of these pipes, it is possible to individually obtain a heat exchange state for each individual refrigerant heat exchanger.

Specifically, as illustrated in FIG. 1, it includes a heat source side refrigerant circuit (70) having a plurality of refrigerant heat exchangers (50, 60), and a plurality of user-side refrigerant circuits (11, 21) corresponding to the respective refrigerant heat exchangers (50, 60).

The heat source side refrigerant circuit (70) includes compressors (41, 42), first switching means (43, 44), and heat source side heat exchangers (45, 46) which are respectively switched by the first switching means (43, 44) between a state where they are communicated to the discharge side of the compressors (41,42) and another state where they are communicated to the suction side thereof.

One end of a high pressure gas pipe (LG-H) is connected between the discharge side of the compressors (41, 42) and the first switching means (43, 44). One end of a low pressure gas pipe (LG-L) is connected between the suction side of the compressors (41, 42) and the first switching means (43, 44). One end of a liquid pipe (LL) is connected to the liquid side of the heat source side heat exchangers (45, 46).

The pipes (LG-H, LG-L, LL) at the other end are branched into branch pipes (LG-H1, LG-H2, LG-L1, LG-L2, LL1, LL2), respectively.

One end side of the refrigerant heat exchanger (50) of one of the plurality of user-side refrigerant circuits (11, 21) is connected to one of the branch pipes (LL1, LL2) of the liquid pipe (LL). One end side of the refrigerant heat exchanger (60) of the other one of the plurality of user-side refrigerant circuits (11, 21) is connected to the other one of the branch pipes (LL1, LL2) of the liquid pipe (LL).

The other end side of the one refrigerant heat exchanger (50) is configured so as to be switched by second switching means (52) between a state where it is communicated to one of the branch pipes (LG-H1, LG-H2) of the high pressure gas pipe (LG-H) and another state where it is communicated to one of the branch pipes (LG-L1, LG-L2) of the low pressure gas pipe (LG-L).

On the other hand, the other end side of the other one refrigerant heat exchanger (60) is configured so as to be switched by second switching means (62) between a state where it is communicated to the other one of the branch pipes (LG-H1, LG-H2) of the high pressure gas pipe (LG-H) and another state where it i s communicated to the other one of the branch pipes (LG-L1, LG-L2) of the low pressure gas pipe (LG-L).

In addition, the heat source side refrigerant circuit (70) and the user-side refrigerant circuits (11, 21) are configured so that the heat source side refrigerant circulating through the heat source side refrigerant circuit (70) and the user-side refrigerants circulating through the user-side refrigerant circuits (11, 21) exchange heat with each other at the refrigerant heat exchangers (50, 60), thereby performing at multi-stage cascade refrigerating cycle.

By this specific element, the heat exchange state at the respective refrigerant heat exchangers (50, 60) can be desirably changed through a switching operation of the first switching means (43, 44) and the second switching means (52,62). In other words, it is possible to individually set, for each user-side refrigerant circuit (11, 21), a state where a cold heat is supplied thereto and another state where a hot heat is supplied thereto.

For example, some of the refrigerant heat exchangers (50, 60) are communicated to the branch pipes (LG-H1, LG-H2) of the high pressure gas pipe (LG-H) and the other refrigerant heat exchangers (50, 60) to the branch pipes (LG-L1, LG-L2) of the low pressure gas pipe (LG-L) by means of the second switching means (52, 62), while the suction side of the compressors (41, 42) is communicated to the heat source side heat exchangers (45, 46) by means of the first switching means (43, 44). The gas refrigerant which has been discharged from the compressors (41, 42) is supplied to the some of the refrigerant heat exchangers (50, 60) and is condensed while exchanging heat with the user-side refrigerant. Thus, a hot heat is provided to the user-side refrigerant circuits (11, 21).

The condensed refrigerant is supplied to the other refrigerant heat exchangers (50, 60) via the branch pipes (LL1, LL2) of the liquid pipe (LL), and is evaporated while exchanging heat with the user-side refrigerant. Thus, a cold heat is provided to the user-side refrigerant circuits (11, 21). The evaporated refrigerant returns to the suction side of the compressors (41, 42) via the low pressure gas pipe (LG-L) and the heat source side heat exchangers (45, 46).

If the refrigerant heat exchangers (50,60) are communicated to the branch pipes (LG-H1, LG-H2) of the high pressure gas pipe (LG-H) by means of the second switching means (52, 62), while the suction side of the compressors (41, 42) is communicated to the heat source side heat exchangers (45, 46) by means of the first switching means (43, 44), a hot heat is provided to the user-side refrigerant circuits (11, 21) at the respective refrigerant heat exchangers (50, 60). Conversely, if the respective refrigerant heat exchangers (50,60) are communicated to the branch pipes (LG-L1, LG-L2) of the low pressure gas pipe (LG-L) by means of the second switching means (52, 62), while the discharge side of the compressors (41, 42) is communicated to the heat source side heat exchangers (45, 46) by means of the first switching means (43, 44), a cold heat is provided to the user-side refrigerant circuits (11, 21) at the respective refrigerant heat exchangers (50, 60).

In this way, it is possible to individually set, for each user-side refrigerant circuit (11, 21), a state where a cold heat is supplied thereto and another state where a hot heat is supplied thereto.

The second solution is designed so that it is possible to individually adjust a refrigerant circulation operation in the user-side refrigerant circuit performing a multi-stage cascade refrigerating cycle with the heat source side refrigerant circuit, and a heat exchange operation of the heat source side refrigerant circuit at the user-side heat exchanger.

Specifically, as illustrated in FIG. 1, it includes the heat source side refrigerant circuit (70) having the refrigerant heat exchanger (50) and the user-side refrigerant circuit (11).

The heat source side refrigerant circuit (70) includes the compressors (41, 42), the first switching means (43, 44), and the heat source side heat exchangers (45, 46) which are switched by the first switching means (43, 44) between a state where they are communicated to the discharge side of the compressors (41, 42) and another state where they are communicated to the suction side thereof.

One end of the high pressure gas pipe (LG-H) is connected between the discharge side of the compressors (41, 42) and the first switching means (43, 44). One end of the low pressure gas pipe (LG-L) is connected between the suction side of the compressors (41, 42) and the first switching means (43, 44). One end of the liquid pipe (LL) is connected to the liquid side of the heat source side heat exchangers (45, 46).

The pipes (LG-H, LG-L, LL) at the other end are branched into branch pipes (LG-H1, LG-H3, LG-L1, LG-L3, LL1, LL3), respectively.

One end side of the refrigerant heat exchanger (50) is connected to one of the branch pipes (LL1, LL3) of the liquid pipe (LL). The other end side of the refrigerant heat exchanger (50) is configured so as to be switched by the second switching means (52) between a state where it is communicated to one of the branch pipes (LG-H1, LG-H3) of the high pressure gas pipe (LG-H) and another state where it is communicated to one of the branch pipes (LG-L1, LG-L3) of the low pressure gas pipe (LG-L).

Moreover, the heat source side refrigerant circuit (70) and the user-side refrigerant circuit (11) are configured so that the heat source side refrigerant circulating through the heat source side refrigerant circuit (70) and the user-side refrigerant circulating through the user-side refrigerant circuit (11) exchange heat with each other at the refrigerant heat exchanger (50), thereby performing a multi-stage cascade refrigerating cycle.

In addition, it includes another user-side heat exchanger (31) in which one end side thereof is connected to the other one of the branch pipes (LL1, LL3) of the liquid pipe (LL) and the other end side thereof is switched by third switching means (33) between a state where it is communicated to the other one of the branch pipes (LG-H1, LG-H3) of the high pressure gas pipe (LG-H) and another state where it is communicated to the other one of the branch pipes (LG-L1, LG-L3) of the low pressure gas pipe (LG-L).

By this specific element, the heat exchange state at the refrigerant heat exchanger (50) and the user-side heat exchanger (31) can be desirably changed through a switching operation of the first switching means (43, 44), the second switching means (52) and the third switching means (33). In other words, it is possible to individually set a state where a cold heat is supplied to the user-side refrigerant circuit (11) and another state where a hot heat is supplied thereto, and a state where the user-side heat exchanger (31) absorbs heat and another state where it radiates heat.

For example, the refrigerant heat exchanger (50) is communicated to the branch pipe (LG-H1) of the high pressure gas pipe (LG-H) by means of the second switching means (52), and the user-side heat exchanger (31) is communicated to the branch pipe (LG-L1) of the low pressure gas pipe (LG-L) by means of the third switching means (33). The gas refrigerant discharged from the compressors (41, 42) is supplied to the refrigerant heat exchanger (50), and is condensed while exchanging heat with the user-side refrigerant. Thus, a hot heat is provided to the user-side refrigerant circuit (11). The condensed refrigerant is supplied to the user-side heat exchanger (31) via the branch pipe (LL3) of the liquid pipe (LL), and is evaporated. Thus, the heat absorption operation of the user-side heat exchanger (31) is performed. The evaporated refrigerant returns to the suction side of the compressors (41, 42) via the low pressure gas pipe (LG-L).

Conversely, if the refrigerant heat exchanger (50) is communicated to the branch pipe (LG-L1) of the low pressure gas pipe (LG-L) by means of the second switching means (52), and the user-side heat exchanger (31) is communicated to the branch pipe (LG-H3) of the high pressure gas pipe (LG-H) by means of the third switching means (33), the gas refrigerant discharged from the compressors (41, 42) is supplied to the user-side heat exchanger (31) and is condensed. Thus, the heat radiation operation of the user-side heat exchanger (31) is performed. The condensed refrigerant is supplied to the refrigerant heat exchanger (50) via the branch pipe (LL1) of the liquid pipe (LL), and is evaporated while exchanging heat with the user-side refrigerant. Thus, a cold heat is provided to the user-side refrigerant circuit (11). The evaporated refrigerant returns to the suction side of the compressors (41, 42) via the low pressure gas pipe (LG-L).

If the refrigerant heat exchanger (50) is communicated to the branch pipe (LG-H1) of the high pressure gas pipe (LG-H) by means of the second switching means (52), and the user-side heat exchanger (31) is also communicated to the branch pipe (LG-H3) of the high pressure gas pipe (LG-H) by means of the third switching means (33), while the discharge side of the compressors (41, 42) is communicated to the heat source side heat exchangers (45, 46) by means of the first switching means (43, 44), a hot heat is provided to the user-side refrigerant circuit (11) and the heat radiation operation of the user-side heat exchanger (31) is performed.

Conversely, if the refrigerant heat exchanger (50) is communicated to the branch pipe (LG-L1) of the low pressure gas pipe (LG-L) by means of the second switching means (52), and the user-side heat exchanger (31) is also communicated to the branch pipe (LG-L3) of the low pressure gas pipe (LG-L) by means of the third switching means (33), while the suction side of the compressors (41, 42) is communicated to the heat source side heat exchangers (45, 46) by means of the first switching means (43, 44), a cold heat is provided to the user-side refrigerant circuit (11) and the heat absorption operation of the user-side heat exchanger (31) is performed.

In this way, it is possible to individually set, for the user-side refrigerant circuit (11) and the user-side heat exchanger (31), a state where a cold heat is supplied thereto and another state where a hot heat is supplied thereto.

A general air conditioner is required to provide not only cooling but also heating of the inside of the room. In other words, regardless of the operation state of the showcases, a cooling operation is required during the summer time and a heating operation is required during the winder time. Where the showcases require a cold heat while the general air conditioner requires a hot heat, or conversely where the showcases require a hot heat while the general air conditioner requires a cold heat, these requirements could not be satisfied with the prior art circuit configurations. The present solution is capable of satisfying these requirements.

The third and fourth solutions embody the configuration of the second switching means. Specifically, the third solution provides the second switching means (52, 62) as three-way valves (52, 62) which are respectively connected to the branch pipes (LG-H1, LG-H2) of the high pressure gas pipe (LG-H), the branch pipes (LG-L1, LG-L2) of the low pressure gas pipe (LG-L) and the gas side of the refrigerant heat exchangers (50, 60).

The fourth solution provides the third switching means (33) as a three-way valve (33) which is connected to the branch pipe (LG-H3) of the high pressure gas pipe (LG-H), the branch pipe (LG-L3) of the low pressure gas pipe (LG-L) and the gas side of the user-side heat exchanger (31).

The fifth solution embodies an exemplary application of the refrigeration system according to the present invention. Specifically, the user-side refrigerant circuit (11) is provided in a food display showcase (10) provided in a supermarket and is configured so as to perform a vapor compression type refrigerating cycle to cool the space in the showcase with a refrigerant which is evaporated at a showcase heat exchanger (15). On the other hand, the other user-side heat exchanger (31) is a heat exchanger (31) for the air conditioning of the inside of the supermarket.

The sixth solution is designed so that the second switching means (52) communicates the other end side of the refrigerant heat exchanger (50) to the branch pipe (LG-H1) of the high pressure gas pipe (LG-H) when melting the frost on the showcase heat exchanger (15).

By these specific elements, for the showcase (10), it is possible to desirably switch between the cooling of the space in the showcase and the defrosting when it is frosted, and it is also possible to desirably switch the cooling/heating of the general air conditioning.

The seventh solution includes a heat source side unit (40) and a plurality of user-side units (10, 20) which are connected to the heat source side unit (40) by the high pressure gas pipe (LG-H), the low pressure gas pipe (LG-L) and the liquid pipe (LL).

Moreover, it includes the switching means (43, 44, 52, 62) for switching the flow of refrigerant so as to supply the gas refrigerant from the heat source side unit (40) or the gas refrigerant from the user-side unit (10, 20) requiring a cold heat to the user-side unit (10, 20) requiring a hot heat through the high pressure gas pipe (LG-H), and to supply the liquid refrigerant from the heat source side unit (40) or the liquid refrigerant from the user-side unit (10, 20) requiring a hot heat to the user-side unit (10, 20) requiring a cold heat through the liquid pipe (LL).

In addition, the user-side units (10, 20) include circulation circuits (11, 21) through which the user-side refrigerant circulates for exchanging heat with the heat source side refrigerant supplied from the heat source side unit (40) or another one of the user-side units (10, 20), so as to perform a multi-stage cascade refrigerating cycle with the heat source side unit (40).

The eighth solution includes the heat source side unit (40) and a plurality of user-side units (10, 20, 30) which are connected to the heat source side unit (40) via the high pressure gas pipe (LG-H), the low pressure gas pipe (LG-L) and the liquid pipe (LL).

Moreover, it includes the switching means (43, 44, 52, 62, 33) for switching the flow of refrigerant so as to supply the gas refrigerant from the heat source side unit (40) or the gas refrigerant from the user-side unit (10, 20) requiring a cold heat to the user-side unit (10, 20, 30) requiring a hot heat through the high pressure gas pipe (LG-H), and to supply the liquid refrigerant from the heat source side unit (40) or the liquid refrigerant from the user-side unit (10, 20) requiring a hot heat to the user-side unit (10, 20, 30) requiring a cold heat through the liquid pipe (LL).

In addition, at least one user-side unit (10, 20) among the plurality of user-side units (10, 20, 30) includes the circulation circuit (11,21) through which the user-side refrigerant circulates for exchanging heat with the heat source side refrigerant supplied from the heat source side unit (40) or another one of the user-side units (10, 20, 30), so as to perform a multi-stage cascade refrigerating cycle with the heat source side unit (40).

By these specific elements, it is possible to individually set, for each user-side refrigerant circuit (11, 21), a state where a cold heat is supplied thereto and another state where a hot heat is supplied thereto, as in the first and second solutions described above.

EFFECTS OF THE INVENTION

As described above, according to the present invention, the following effects are realized.

The first solution provides a refrigeration system including the plurality of refrigerant heat exchangers (50, 60) for exchanging heat between a heat source side refrigerant and a user-side refrigerant of a multi-stage cascade refrigerating cycle which has a configuration such that each individual refrigerant heat exchanger (50, 60) can be selectively communicated to the high pressure gas pipe (LG-H), the low pressure gas pipe (LG-L) and the liquid pipe (LL). By selecting the communication state of these pipes (LG-H, LG-L, LL), it is possible to individually obtain a heat exchange state for each individual refrigerant heat exchanger (50, 60).

The second solution is designed so that it is possible to individually adjust a refrigerant circulation operation in the user-side refrigerant circuit (11) performing a multi-stage cascade refrigerating cycle with the heat source side refrigerant circuit (70), and a heat exchange operation of the heat source side refrigerant circuit (70) at the user-side heat exchanger (31). Thus, it is possible, with a single refrigerating system, to obtain a cold heat and a hot heat according to the requirement from each user-side refrigerant circuit (11, 21) or the user-side heat exchanger (31), whereby it is possible to improve the practicability of a refrigeration system.

If it is designed so that heat can be exchanged between the respective user-side units (10, 20, 30), it is possible to effectively utilize the waste heat. As a result, it is possible to suppress the amount of heat necessary for the heat source side refrigerant which is to be provided to the respective user-side units (10, 20, 30), whereby it is possible to realize an improvement in the energy saving property and a reduction in the running cost associated therewith.

If the switching means (52, 62, 33) for switching the communication state of the pipes (LG-H, LG-L, LL) are provided as three-way valves, it is possible, with a relatively simple configuration and control operation, to obtain a cold heat and a hot heat according to the requirement from each user-side refrigerant circuit (11, 21) or the user-side heat exchanger (31).

Moreover, if the refrigeration system according to the present invention is applied to the food display showcases (10, 20) provided in a supermarket while being used for the air conditioning of the inside of the room, it is possible to individually perform the cooling and defrosting of the showcases (10, 20) and the cooling/heating of the inside of the room. As a result, it is possible, with a single refrigerating system, to ensure the maintenance of the freshness of food and the comfort of the inside of the room.

BEST MODE FOR CARRYING OUT THE INVENTION

Figure 1:
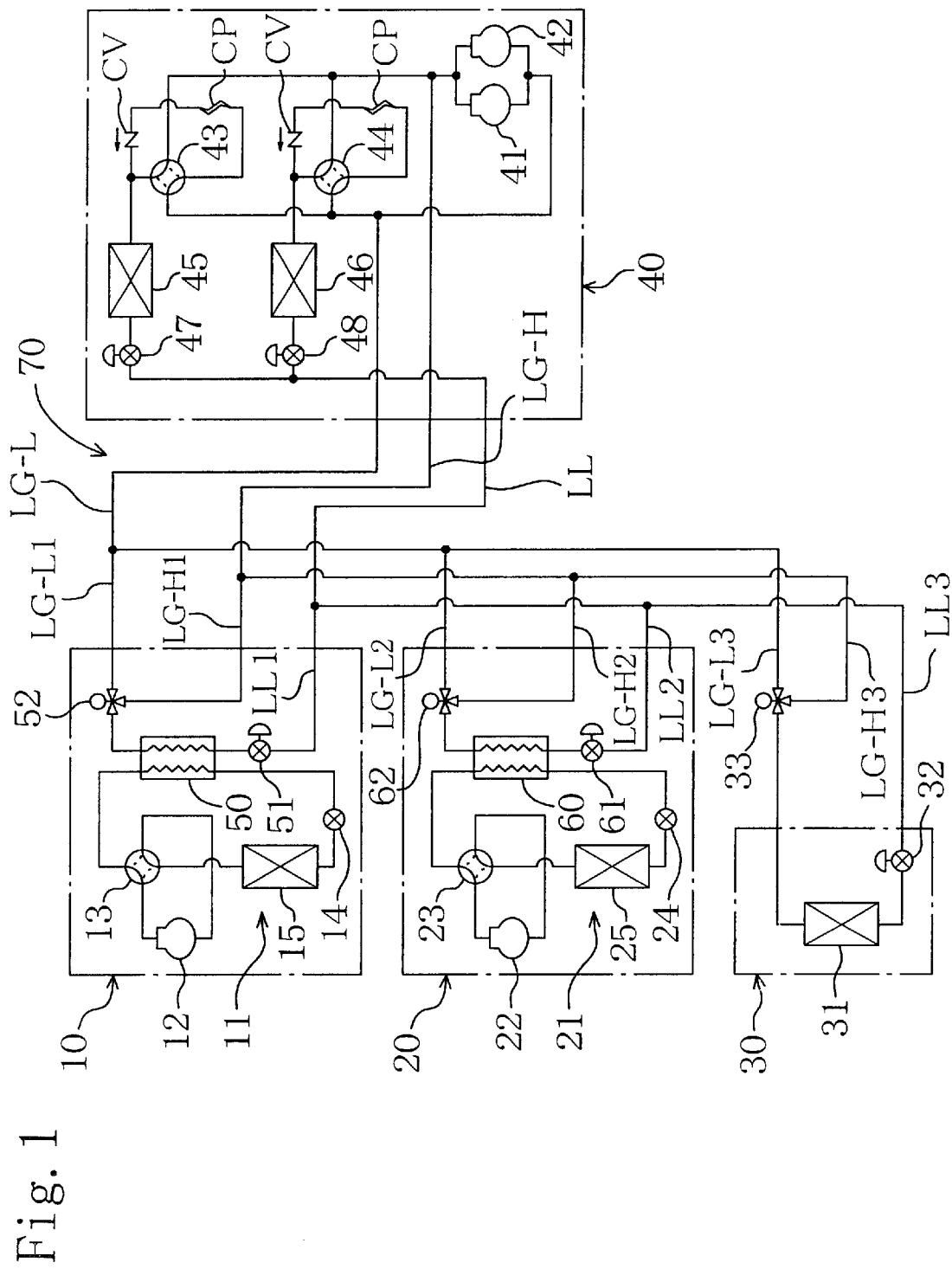
FIG. 1 is a diagram illustrating a refrigerant piping system of a refrigeration system according to an embodiment.

An embodiment of the present invention will now be described with reference to the drawings. In the present embodiment, a case where a refrigeration system according to the present invention is applied to a supermarket will be described.

Description of the Required Temperature Environments

Prior to the description of the refrigeration system, the temperature environments required in the respective areas in a supermarket (in a showcase, in an in-store sales area, etc.) will be described first.

In the in-store sales area of the supermarket, a freezing showcase (10) for displaying frozen food and a refrigerated showcase (20) for displaying refrigerated food are installed. For example, in-case temperature environments of $-20°$ C. and $0°$ C. are required in the freezing showcase (10) and in the refrigerated showcase (20), respectively.

General air conditioned rooms such as the inside of the store, the employees' office, etc., also exist in the supermarket. In the general air conditioned room, an indoor air conditioning unit (30) is arranged. A temperature environment of $25°$ C., for example, is required in the general air conditioned room.

In addition, although not shown, a storage for storing various food therein (commonly called a "backyard") and a food processing room where employees perform operations such as packaging food, etc., exist in the supermarket. Also in the storage and the food processing room, an appropriate temperature environment is required. The showcases (10, 20) and the indoor air conditioning unit (30), etc., are user-side units as used in the present invention.

Description of Refrigeration System

Next, a refrigeration system according to the present embodiment will be described.

In the present device, the freezing showcase (10), the refrigerated showcase (20) and the indoor air conditioning unit (30) are connected to a single outdoor unit (40) as a heat source side unit by a plurality of refrigerant pipes (LG-H, LG-L, LL). Specifically, the refrigerant pipes (LG-H, LG-L, LL) are a high pressure gas pipe (LG-H), a low pressure gas pipe (LG-L) and a liquid pipe (LL). The refrigerant pipes (LG-H, LG-L, LL) extending from the outdoor unit (40) are each branched into three branch pipes (LG-H1–LG-H3, LG-L1–LG-L3, LL1–LL3), and are each connected to the freezing showcase (10),the refrigerated showcase (20) and the indoor air conditioning unit (30). Thus, the respective showcases (10, 20) and the indoor air conditioning unit (30) are connected in parallel to one another.

The units (30, 40) and the showcases (10, 20) will now be described.

Description of Outdoor Unit (40)

The outdoor unit (40) is installed outside of the supermarket. The outdoor unit (40) includes a pair of outdoor compressors (41, 42). One (42) of the pair of compressors (41, 42) is a capacity variable type compressor using an inverter or an unloader. The discharge sides of the outdoor compressors (41, 42) once merge together and are then branched, and the branch pipes are respectively connected to one port of a pair of outdoor four-way switching valves (43, 44) as the first switching means. Similarly, the suction sides of the outdoor compressors (41, 42) once merge together and are then branched, and the branch pipes are respectively connected to another port of the pair of outdoor four-way switching valves (43, 44).

The outdoor unit (40) includes a pair of outdoor heat exchangers (45, 46) as the heat source side heat exchangers, and outdoor expansion valves (47, 48) connected to the liquid side of the outdoor heat exchangers (45, 46). The gas side of the outdoor heat exchanger (45, 46) is connected to another port of the outdoor four-way switching valve (43, 44), respectively. Moreover, the remaining one port of the outdoor four-way switching valves (43, 44) is connected to the gas side of the outdoor heat exchangers (45, 46) via a capillary tube (CP) and a check valve (CV).

By a switching operation of the outdoor four-way switching valves (43, 44), the communication state of the respective outdoor heat exchangers (45, 46) with respect to the outdoor compressors (41, 42) is switched from one to another. Specifically, in the switching state as indicated by solid lines in the figure, the gas side of the respective outdoor heat exchangers (45, 46) is communicated to the discharge side of the outdoor compressors (41, 42). On the other hand, in the switching state as indicated by broken lines in the figure, the gas side of the respective outdoor heat exchangers (45, 46) is communicated to the suction side of the outdoor compressors (41, 42).

The connected positions of the refrigerant pipes (LG-H, LG-L, LL) in the outdoor unit (40) will be described. One end of the high pressure gas pipe (LG-H) is connected to the discharge side of the outdoor compressors (41, 42). One end of the low pressure gas pipe (LG-L) is connected to the suction side of the outdoor compressors (41, 42). Moreover, one end of the liquid pipe (LL) is branched in the outdoor unit (40) and connected to the outdoor expansion valves (47, 48), respectively.

Description of Freezing Showcase (10) and Refrigerated Showcase (20)

Next, the freezing showcase (10) and the refrigerated showcase (20) will be described. The circuit configurations of the respective showcases (10, 20) are generally similar to each other.

The freezing showcase (10) and the refrigerated showcase (20) include user-side refrigerant circuits (11, 21) each of which is comprised of a closed circuit. Heat exchange is performed between the user-side refrigerant circuits (11, 21) and the refrigerant which has been introduced from the outdoor unit (40) via the refrigerant pipes (LG-H, LG-L, LL).

Specifically, the showcases (10, 20) include refrigerant heat exchangers (50, 60) for exchanging heat between the refrigerant of the user-side refrigerant circuits (11, 21) and the refrigerant introduced from the outdoor unit (40). The refrigerant heat exchangers (50, 60) are so-called "cascade-type heat exchangers", wherein the gas side of the refrigerant heat exchanger (50, 60) is connected to the branch pipe (LG-L1, LG-L2) of the low pressure gas pipe (LG-L), and the liquid side thereof is connected to the branch pipe (LL1, LL2) of the liquid pipe (LL).

The branch pipe (LL1, LL2) of the liquid pipe (LL) is provided with an expansion valve (51, 61). Moreover, each branch pipe (LG-L1, LG-L2) of the low pressure gas pipe (LG-L) includes a three-way valve (52, 62) as the second switching means. One end of the branch pipe (LG-H1, LG-H2) of the high pressure gas pipe (LG-H) is connected to the three-way valve (52, 62). Thus, by a switching operation of the three-way valve (52, 62), it is possible to switch between a state where the gas side of the refrigerant heat exchanger (50, 60) is connected to the suction side of the outdoor compressors (41, 42) via the low pressure gas pipe (LG-L) and another state where it is connected to the discharge side of the outdoor compressors (41, 42) via the high pressure gas pipe (LG-H). The heat source side refrigerant circuit (70) is configured by the outdoor unit (40) and the refrigerant heat exchangers (50, 60) with such a circuit configuration.

The user-side refrigerant circuit (11, 21) includes a showcase compressor (12,22), a four-way switching valve (13, 23), the refrigerant heat exchanger (50, 60), an expansion valve (14, 24) and a showcase heat exchanger (15, 25) which are connected together by a refrigerant pipe. The four-way switching valve (13, 23) can be switched between a state where the discharge side of the showcase compressor (12, 22) is communicated to the refrigerant heat exchanger (50, 60) and the suction side thereof to the showcase heat exchanger (15, 25), and another state where the discharge side of the showcase compressor (12, 22) is communicated to the showcase heat exchanger (15, 25) and the suction side thereof to the refrigerant heat exchanger (50, 60).

In this way, a so-called "multiple two-stage cascade refrigerating circuit" is formed by the heat source side refrigerant circuit (70) and the user-side refrigerant circuits (11, 21).

Description of Indoor Air Conditioning Unit (30)

Next, the indoor air conditioning unit (30) will be described.

The indoor air conditioning unit (30) includes an indoor heat exchanger (31) as the general air conditioning heat exchanger. The branch pipe (LG-L3) of the low pressure gas pipe (LG-L) and the branch pipe (LL3) of the liquid pipe (LL) are connected respectively to the gas side and the liquid side of the indoor heat exchanger (31). The branch pipe (LL3) of the liquid pipe (LL) is provided with an expansion valve (32).

Moreover, the branch pipe (LG-L3) of the low pressure gas pipe (LG-L) includes the three-way valve (33) as the third switching means. One end of the branch pipe (LG-H3)

of the high pressure gas pipe (LG-H) is connected to the three-way valve (33). Thus, by a switching operation of the three-way valve (33), it is possible to switch between a state where the gas side of the indoor heat exchanger (31) is connected to the suction side of the outdoor compressors (41,42) via the low pressure gas pipe (LG-L) and another state where it is connected to the discharge side of the outdoor compressors (41, 42) via the high pressure gas pipe (LG-H).

With such a circuit configuration, a closed circuit for performing a single-stage refrigerating cycle is formed between the outdoor unit (40) and the indoor air conditioning unit (30), wherein the outdoor compressors (41, 42) and the outdoor heat exchangers (45, 46) of the outdoor unit (40) and the expansion valve (32) and the indoor heat exchanger (31) of the indoor air conditioning unit (30) are connected together.

The outdoor four-way switching valves (43, 44) and the three-way valves (52, 62, 33) described above form the switching means as used in the present invention.

Moreover, the present refrigeration system includes a controller, not shown. The operation of each compressors (12, 22, 41, 42) and the opening control of each valve (13, 23, 14, 24, 32, 43, 44, 47, 48, 51, 61, 52, 62) are performed through the controller, so as to obtain the above-described temperature environments in the showcases (10, 20) and in the room.

The capacity control of the capacity variable type compressor (42) in the outdoor unit (40) is performed based on the following conditions. Specifically,the capacity control of the compressor (42) is performed based on the operation mode to be described later of each showcase (10, 20) and the indoor air conditioning unit (30), the number of units to be on a defrost operation which is performed when the showcase heat exchangers (15, 25) are frosted, the refrigerant pressure in the circuit (70), etc.

Description of Operation Modes

Next, the operation of the present refrigeration system will be described. The representative operation modes of the present device include six modes as listed below.

The first mode is a normal operation mode during the summer time, wherein a cooling operation for the showcases (10, 20) and a cooling operation for the inside of the room are performed.

The second mode is an operation mode for when the showcase heat exchangers (15, 25) of the respective showcases (10, 20) are frosted during the winter time, wherein a defrost operation for the showcases (10, 20) and a heating operation for the inside of the room are performed.

The third mode is an operation mode for when the showcase heat exchanger (15) of one showcase (10) is frosted during the summer time, wherein a defrost operation for the one showcase (10), a cooling operation for the other showcase (20) and a cooling operation for the inside of the room are performed.

The fourth mode is an operation mode for when the showcase heat exchanger (25) of one showcase (20) is frosted during the winter time, wherein a defrost operation for the one showcase (20), a cooling operation for the other showcase (10) and a heating operation for the inside of the room are performed.

The fifth mode is an operation mode for when the showcase heat exchangers (15, 25) of the respective showcases (10, 20) are frosted during the summer time, wherein a defrost operation for the showcases (10, 20) and a cooling operation for the inside of the room are performed.

The sixth mode is a normal operation mode during the winter time, wherein a cooling operation for the showcases (10, 20) and a heating operation for the inside of the room are performed.

Operation in First Mode

During operation in the first mode, a cold heat obtained at the outdoor heat exchanger (45, 46) is carried to the refrigerant heat exchangers (50, 60) and the indoor heat exchanger (31) through a refrigerant circulation operation in the heat source side refrigerant circuit (70). Moreover, in each showcase (10, 20), a cold heat obtained at the refrigerant heat exchanger (50, 60) is carried to the showcase heat exchanger (15, 25) through a refrigerant circulation operation in the user-side refrigerant circuit (11, 21). Thus, the cooling of the inside of the room and the cooling of the showcases (10, 20) are performed. The operation in the first mode will now be described in greater detail.

During operation in the first mode, the outdoor four-way switching valves (43, 44) of the outdoor unit (40) are each in a state as indicated by a solid line in the figure, and the four-way switching valves (13, 23) of the respective showcases (10, 20) are each also in a state as indicated by a solid line in the figure. The three-way valves (52, 62) of the respective showcases (10, 20) are each in a switched state such that the gas side of the refrigerant heat exchanger (50, 60) is communicated to the suction side of the outdoor compressors (41, 42) via the low pressure gas pipe (LG-L).

The three-way valve (33) which is coupled to the indoor air conditioning unit (30) is in a switched state such that the gas side of the indoor heat exchanger (31) is communicated to the suction side of the outdoor compressors (41, 42) via the low pressure gas pipe (LG-L). Moreover, each expansion valve (14, 24, 32, 47, 48, 51, 61) is adjusted to a predetermined opening.

In this state, the compressors (12, 22, 41, 42) are driven. As indicated by an arrow in FIG. 2, in the heat source side refrigerant circuit (70), the refrigerant discharged from the outdoor compressors (41, 42) flows into the outdoor heat exchanger (45, 46) via the outdoor four-way switching valves (43, 44), and is condensed while exchanging heat with the outside air. The condensed liquid refrigerant flows into the showcases (10, 20) and the indoor air conditioning unit (30) via the respective branch pipes (LL1–LL3) of the liquid pipe (LL).

The liquid refrigerant which has flown into the indoor air conditioning unit (30) is depressurized through the expansion valve (32), and is evaporated while exchanging heat with the room air at the indoor heat exchanger (31). At this time, a cold heat is provided to the room air. Specifically, the room air is cooled to 25° C., for example.

On the other hand, the liquid refrigerant which has flown into the showcase (10, 20) is depressurized through the expansion valve (51, 61), and then evaporated while exchanging heat with the refrigerant of the user-side refrigerant circuit (11, 21) at the refrigerant heat exchanger (50, 60). At this time, a cold heat is provided to the refrigerant of the user-side refrigerant circuit (11, 21). The gas refrigerant which has been evaporated at the refrigerant heat exchanger (50, 60) passes through the three-way valve (52, 62) and then merges with the gas refrigerant which has been evaporated at the indoor heat exchanger (31). The merged gas refrigerant is taken into the outdoor compressors (41, 42) via the low pressure gas pipe (LG-L).

A refrigerant circulation operation as described above is performed in the heat source side refrigerant circuit (70). In this way, the indoor air conditioning unit (30) performs the cooling of the inside of the room by performing a single-stage refrigerating cycle with the outdoor unit (40).

Figure 2:
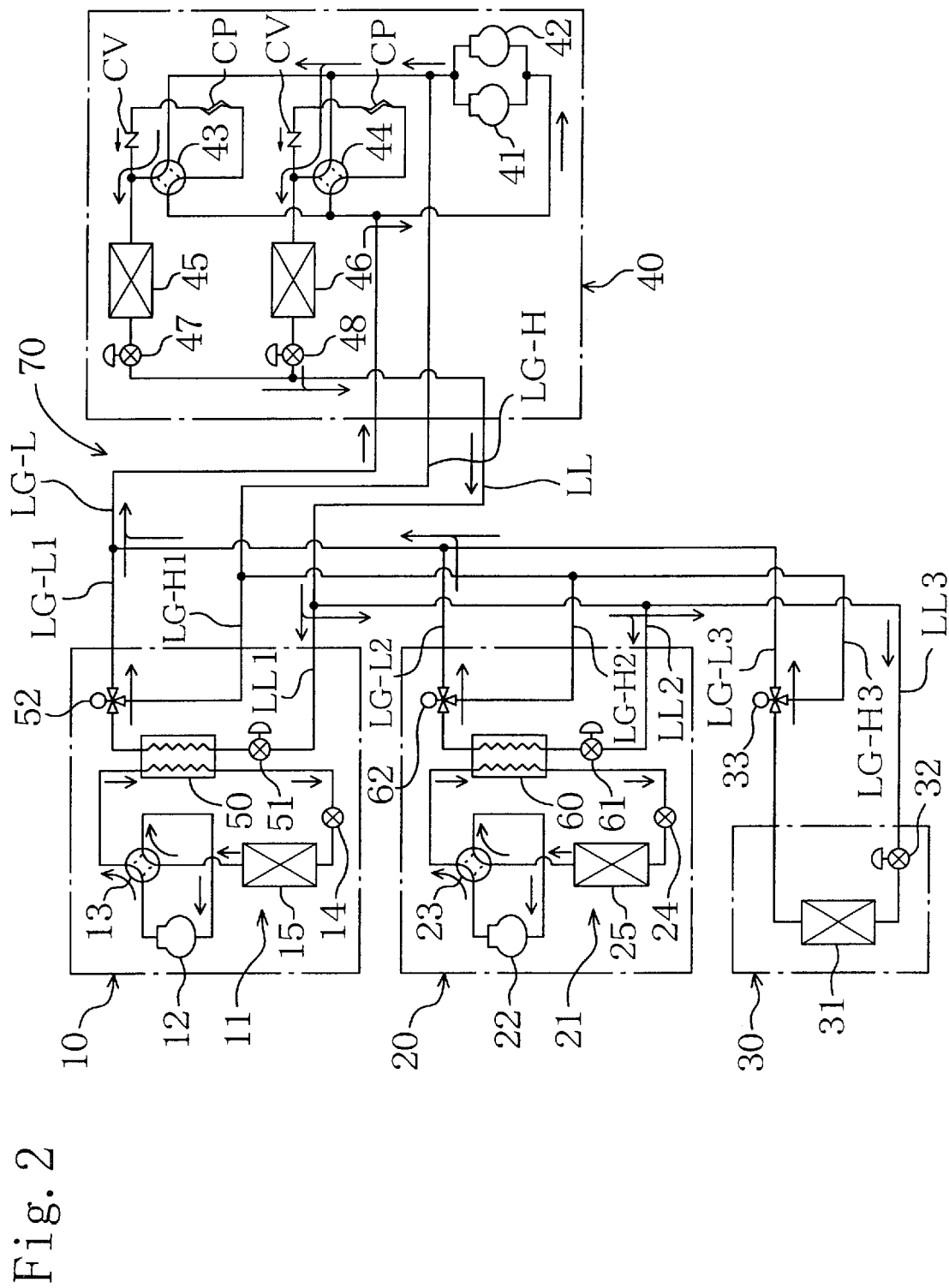
FIG. 2 is a diagram illustrating the operation of a first mode.

In the user-side refrigerant circuit (11, 21) of each showcase (10, 20), the refrigerant which has been discharged from the showcase compressor (12, 22) flows into the refrigerant heat exchanger (50, 60) via the four-way switching valve (13, 23), as indicated by an arrow in FIG. 2, and is condensed while exchanging heat with the refrigerant of the heat source side refrigerant circuit (70). The condensed liquid refrigerant is depressurized through the expansion valve (14, 24), and then evaporated while exchanging heat with the air in the showcase at the showcase heat exchanger (15, 25). At this time, a cold heat is provided to the air in the showcase.

Specifically, the air is cooled to −20° C. in the freezing showcase (10), whereas the air is cooled to 0° C. in the refrigerated showcase (20). The gas refrigerant which has been evaporated at the showcase heat exchanger (15, 25) is taken into the showcase compressor (12, 22) via the four-way switching valve (13, 23). A refrigerant circulation operation as described above is performed in the user-side refrigerant circuit (11, 21). In this way, in the freezing showcase (10) and the refrigerated showcase (20), a cold heat of a relatively low temperature is obtained by performing a two-stage refrigerating cycle with the outdoor unit (40).

This is the operation in the first mode.

Operation in Second Mode

During operation in the second mode, a hot heat obtained at the outdoor heat exchanger (45, 46) is carried to the refrigerant heat exchangers (50,60) and the indoor heat exchanger (31) through a refrigerant circulation operation in the heat source side refrigerant circuit (70). Moreover, in each showcase (10, 20), a hot heat obtained at the refrigerant heat exchanger (50, 60) is carried to the showcase heat exchanger (15, 25) through a refrigerant circulation operation in the user-side refrigerant circuit (11, 21). Thus, the inside of the room is heated, and the frost on the showcase heat exchanger (15, 25) of the showcase (10, 20) is melted. The operation in the second mode will now be described in greater detail.

During operation in the second mode, the outdoor four-way switching valves (43, 44) of the outdoor unit (40) are each in a state as indicated by a broken line in the figure, and the four-way switching valves (13, 23) of the respective showcases (10, 20) are each also in a state as indicated by a broken line in the figure. The three-way valves (52, 62) of the respective showcases (10, 20) are each in a switched state such that the gas side of the refrigerant heat exchanger (50, 60) is connected to the discharge side of the outdoor compressors (41, 42) via the high pressure gas pipe (LG-H).

The three-way valve (33) which is coupled to the indoor air conditioning unit (30) is in a switched state such that the gas side of the indoor heat exchanger (31) is communicated to the discharge side of the outdoor compressors (41, 42) via the high pressure gas pipe (LG-H). Moreover, each expansion valve (14, 24, 32, 47, 48, 51, 61) is adjusted to a predetermined opening.

In this state, the compressors (12, 22, 41, 42) are driven. As indicated by an arrow in FIG. 3, in the heat source side refrigerant circuit (70), the refrigerant discharged from the outdoor compressors (41, 42) flows into the showcases (10, 20) and the indoor air conditioning unit (30) via the respective branch pipes (LG-H1 - LG-H3) of the high pressure gas pipe (LG-H).

The gas refrigerant which has flown into the indoor air conditioning unit (30) flows into the indoor heat exchanger (31) via the three-way valve (33), and is condensed while exchanging heat with the room air at the indoor heat exchanger (31). At this time, a hot heat is provided to the room air. Specifically, the room air is heated to 20° C., for example.

On the other hand, the liquid refrigerant which has flown into the showcase (10, 20) flows into the refrigerant heat exchanger (50, 60) via the three-way valve (52, 62), and is condensed while exchanging heat with the refrigerant of the user-side refrigerant circuit (11, 21) at the refrigerant heat exchanger (50, 60). At this time, a hot heat is provided to the refrigerant of the user-side refrigerant circuit (11, 21). These liquid refrigerants which have been condensed at the indoor heat exchanger (31) and the refrigerant heat exchanger (50, 60) merge together in the liquid pipe (LL) and return to the outdoor unit (40). The liquid refrigerant which has returned to the outdoor unit (40) is depressurized through the outdoor expansion valve (47, 48), evaporated while exchanging heat with the outside air at the outdoor heat exchanger (45, 46), and is then taken into the outdoor compressors (41, 42) via the outdoor four-way switching valves (43, 44).

A refrigerant circulation operation as described above is performed in the heat source side refrigerant circuit (70). In this way, the indoor air conditioning unit (30) performs the heating of the inside of the room by performing a single-stage refrigerating cycle with the outdoor unit (40).

Figure 3:
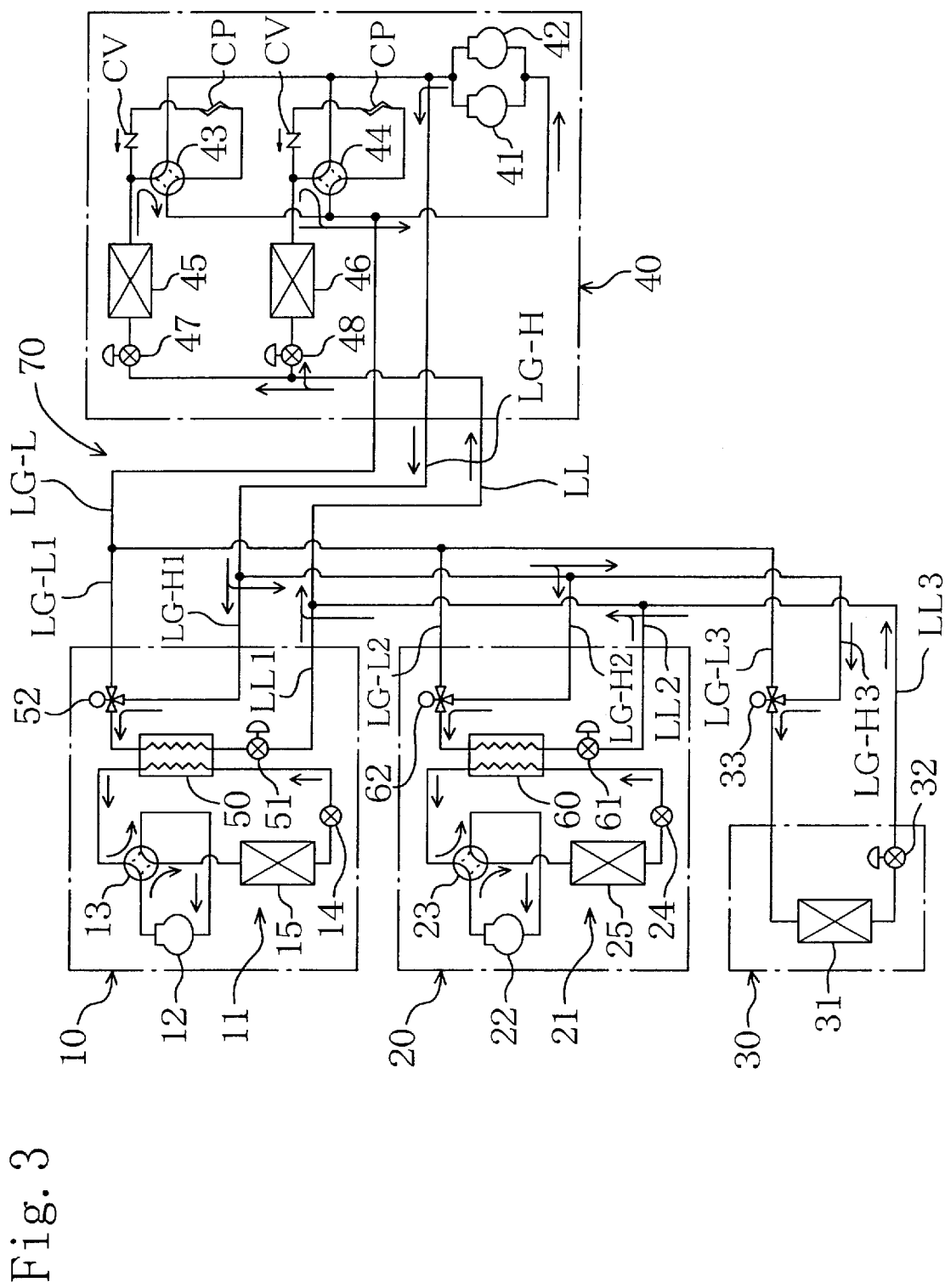
FIG. 3 is a diagram illustrating the operation of a second mode.

In the user-side refrigerant circuit (11, 21) of each showcase (10, 20), the refrigerant which has been discharged from the showcase compressor (12, 22) flows into the showcase heat exchanger (15, 25) via the outdoor four-way switching valve (13, 23), as indicated by an arrow in FIG. 3, and is condensed while melting the frost on the showcase heat exchanger (15, 25). The condensed refrigerant is depressurized through the expansion valve (14, 24), after which it flows into the refrigerant heat exchanger (50, 60), and is evaporated while exchanging heat with the refrigerant of the heat source side refrigerant circuit (70). The evaporated gas refrigerant is taken into the showcase compressor (12, 22) via the four-way switching valve (13, 23).

A refrigerant circulation operation as described above is performed in the user-side refrigerant circuit (11, 21). In this way, in the freezing showcase (10) and the refrigerated showcase (20), the frost on the showcase heat exchanger (15, 25) is melted by performing a two-stage refrigerating cycle with the outdoor unit (40).

This is the operation in the second mode.

Operation in Third Mode

During operation in the third mode, a cold heat obtained at the outdoor heat exchanger (46) and the refrigerant heat exchanger (50) of the freezing showcase (10) is carried to the refrigerant heat exchanger (60) of the refrigerated showcase (20) and the indoor heat exchanger (31) through a refrigerant circulation operation in the heat source side refrigerant circuit (70). Thus, the cooling of the inside of the room is performed.

Moreover, in the freezing showcase (10), a hot heat obtained at the refrigerant heat exchanger (50) is carried to the showcase heat exchanger (15) through a refrigerant circulation operation in the user-side refrigerant circuit (11), thereby melting the frost on the showcase heat exchanger (15). Moreover, in the refrigerated showcase (20), a cold heat obtained at the refrigerant heat exchanger (60) is carried to the showcase heat exchanger (25) through a refrigerant circulation operation in the user-side refrigerant circuit (21). Thus, the cooling of the refrigerated showcase (20) is performed. The operation in the third mode will now be described in greater detail.

During operation in the third mode, one (the lower one in FIG. 4) outdoor four-way switching valve (44) of the outdoor unit (40) is in a state as indicated by a solid line in the figure. The four-way switching valve (13) of the freezing showcase (10) is in a state as indicated by a broken line in the figure. The four-way switching valve (23) of the refrigerated showcase (20) is in a state as indicated by a solid line in the figure. The three-way valve (52) of the freezing showcase (10) is in a switched state such that the gas side of the refrigerant heat exchanger (50) is connected to the discharge side of the outdoor compressors (41, 42) via the high pressure gas pipe (LG-H). The three-way valve (62) of the refrigerated showcase (20) is in a switched state such that the gas side of the refrigerant heat exchanger (60) is connected to the suction side of the outdoor compressors (41, 42) via the low pressure gas pipe (LG-L).

The three-way valve (33) which is coupled to the indoor air conditioning unit (30) is in a switched state such that the gas side of the indoor heat exchanger (31) is communicated to the suction side of the outdoor compressors (41, 42) via the low pressure gas pipe (LG-L). Moreover, one (the upper one in FIG. 4) outdoor expansion valve (47) of the outdoor unit (40) is closed, and the other expansion valves (14, 24, 32, 48, 51, 61) are each adjusted to a predetermined opening.

In this state, the compressors (12, 22, 41, 42) are driven. As indicated by an arrow in FIG. 4, in the heat source side refrigerant circuit (70), a part of the refrigerant discharged from the outdoor compressors (41, 42) flows into the freezing showcase (10) via the branch pipe (LG-H1) of the high pressure gas pipe (LG-H). The gas refrigerant which has flown into the freezing showcase (10) flows into the refrigerant heat exchanger (50) via the three-way valve(52), and is condensed while exchanging heat with the refrigerant of the user-side refrigerant circuit (11) at the refrigerant heat exchanger (50). At this time, a hot heat is provided to the refrigerant of the user-side refrigerant circuit (11). The condensed liquid refrigerant flows out into the liquid pipe (LL).

On the other hand, the other part of the refrigerant discharged from the outdoor compressors (41, 42) flows into the outdoor heat exchanger (46) via the outdoor four-way switching valve (44), is condensed while exchanging heat with the outside air, and flows through the liquid pipe (LL).

These liquid refrigerants which have been condensed at the refrigerant heat exchanger (50) and the outdoor heat exchanger (46) merge together in the liquid pipe (LL) and flow into the refrigerated showcase (20) and the indoor air conditioning unit (30) via the respective branch pipes (LL2, LL3) of the liquid pipe (LL).

The liquid refrigerant which has flown into the indoor air conditioning unit (30) is depressurized through the expansion valve (32), and is evaporated while exchanging heat with the room air at the indoor heat exchanger (31). At this time, a cold heat is provided to the room air. Specifically, the room air is cooled to 25° C., for example.

On the other hand, the liquid refrigerant which has flown into the refrigerated showcase (20) is depressurized through the expansion valve (61), and then evaporated while exchanging heat with the refrigerant of the user-side refrigerant circuit (21) at the refrigerant heat exchanger (60). At this time, a cold heat is provided to the refrigerant of the user-side refrigerant circuit (21). The gas refrigerant which has been evaporated at the refrigerant heat exchanger (60) passes through the three-way valve (62) and then merges with the gas refrigerant which has been evaporated at the indoor heat exchanger (31). The merged gas refrigerant is taken into the outdoor compressors (41, 42) via the low pressure gas pipe (LG-L). A refrigerant circulation operation as described above is performed in the heat source side refrigerant circuit (70). In this way, the indoor air conditioning unit (30) performs the cooling of the inside of the room by performing a single-stage refrigerating cycle with the outdoor unit (40).

Figure 4:
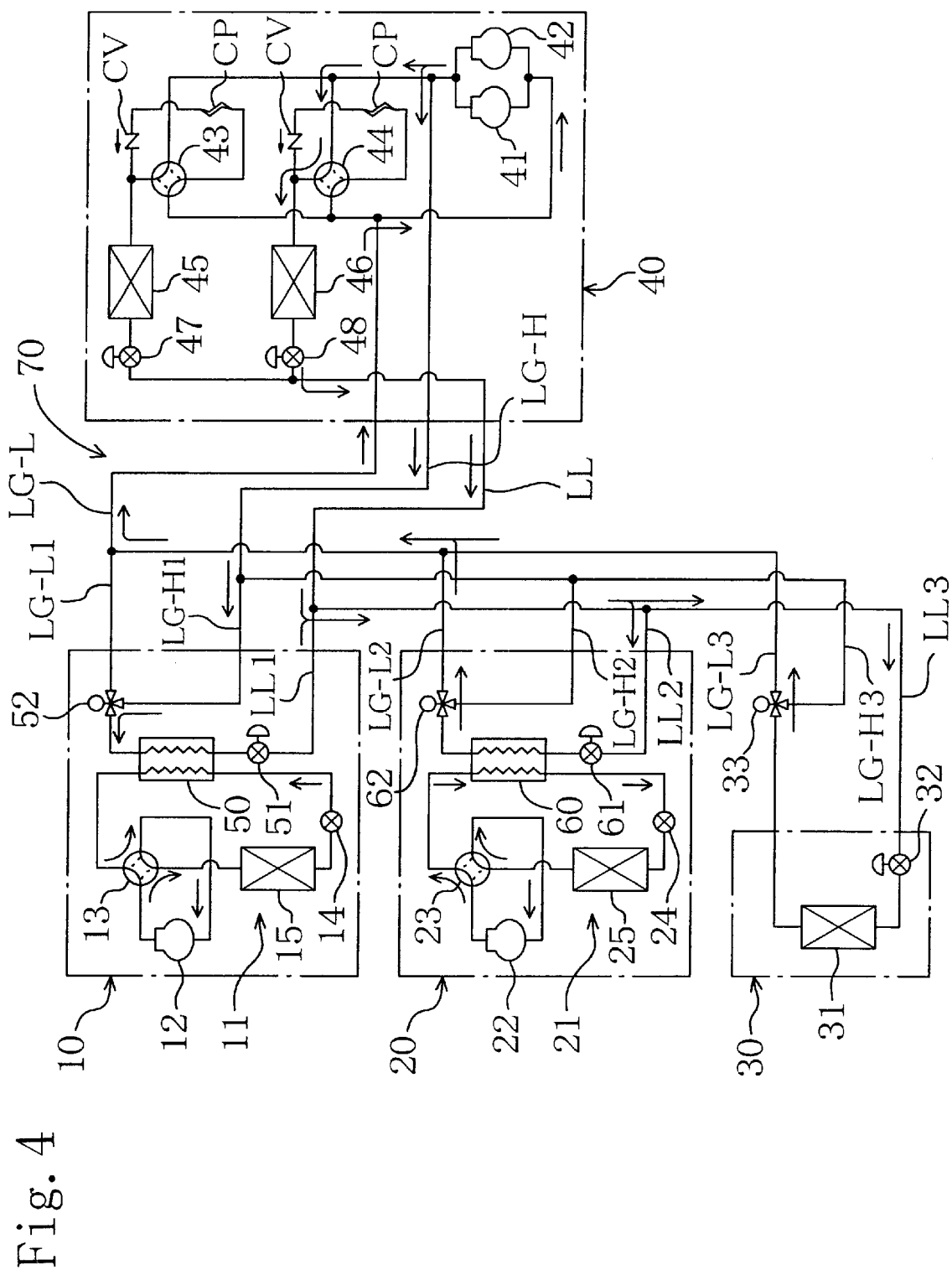
FIG. 4 is a diagram illustrating the operation of a third mode.

In the user-side refrigerant circuit (11) of the freezing showcase (10), the refrigerant circulates as indicated by an arrow in FIG. 4, thereby melting the frost on the showcase heat exchanger (15) as in the operation in the second mode described above.

In the user-side refrigerant circuit (21) of the refrigerated showcase (20), the refrigerant circulates as indicated by an arrow in FIG. 4, thereby obtaining a cold heat of a relatively low temperature as in the operation in the first mode described above.

This is the operation in the third mode. In the present operation in the third mode, the cold heat obtained in the freezing showcase (10) is utilized for the cooling in the refrigerated showcase (20) and the cooling in the indoor air conditioning unit (30). Thus, it is not necessary to exchange all the heat between the user-side units (10, 20, 30) and the outdoor heat exchangers (45, 46). Therefore, it is possible to suppress the capacity of the outdoor compressors (41, 42). Specifically, the operation frequency of one compressor (42) of the capacity variable type is set to be, for example, about one half of the maximum frequency.

Operation in Fourth Mode

During operation in the fourth mode, a hot heat obtained at the outdoor heat exchanger (45) and the refrigerant heat exchanger (50) of the freezing showcase (10) is carried to the refrigerant heat exchanger (60) of the refrigerated showcase (20) and the indoor heat exchanger (31) through a refrigerant circulation operation in the heat source side refrigerant circuit (70). Thus, the heating of the inside of the room is performed.

Moreover, in the freezing showcase (10), a cold heat obtained at the refrigerant heat exchanger (50) is carried to the showcase heat exchanger (15) through a refrigerant circulation operation in the user-side refrigerant circuit (11). Thus, the cooling of the freezing showcase (10) is performed. In the refrigerated showcase (20), a hot heat obtained at the refrigerant heat exchanger (60) is carried to the showcase heat exchanger (25) through a refrigerant circulation operation in the user-side refrigerant circuit (21), thereby melting the frost on the showcase heat exchanger (25). The operation in the fourth mode will now be described in greater detail.

During operation in the fourth mode, one (the upper one in FIG. 5) outdoor four-way switching valve (43) of the outdoor unit (40) is in a state as indicated by a broken line in the figure. The four-way switching valve (13) of the freezing showcase (10) is in a state as indicated by a solid line in the figure. The four-way switching valve (23) of the refrigerated showcase (20) is in a state as indicated by a broken line in the figure. The three-way valve (52) of the freezing showcase (10) is in a switched state such that the gas side of the refrigerant heat exchanger (50) is connected to the suction side of the outdoor compressors (41,42) via the low pressure gas pipe(LG-L). The three-way valve (62) of the refrigerated showcase (20) is in a switched state such that the gas side of the refrigerant heat exchanger (60) is connected to the discharge side of the outdoor compressors (41, 42) via the high pressure gas pipe (LG-H).

The three-way valve (33) which is coupled to the indoor air conditioning unit (30) is in a switched state such that the gas side of the indoor heat exchanger (31) is communicated to the discharge side of the outdoor compressors (41, 42) via the high pressure gas pipe (LG-H). Moreover, one (the lower one in FIG. 5) outdoor expansion valve (48) of the outdoor unit (40) is closed, and the other expansion valves (14, 24, 32, 47, 51, 61) are each adjusted to a predetermined opening.

In this state, the compressors (12, 22, 41, 42) are driven. As indicated by an arrow in FIG. 5, in the heat source side refrigerant circuit (70), the refrigerant discharged from the outdoor compressors (41, 42) flows into the refrigerated showcase (20) and the indoor air conditioning unit (30) via the branch pipes (LG-H2, LG-H3) of the high pressure gas pipe (LG-H). The gas refrigerant which has flown into the refrigerated showcase (20) flows into the refrigerant heat exchanger (60) via the three-way valve (62), and is condensed while exchanging heat with the refrigerant of the user-side refrigerant circuit (21) at the refrigerant heat exchanger (60). At this time, a hot heat is provided to the refrigerant of the user-side refrigerant circuit (21). The condensed liquid refrigerant flows out into the liquid pipe (LL).

The gas refrigerant which has flown into the indoor air conditioning unit (30) flows into the indoor heat exchanger (31) via the three-way valve (33). The gas refrigerant which has flown into the indoor heat exchanger (31) is condensed while exchanging heat with the room air. At this time, a hot heat is provided to the room air.

These liquid refrigerants which have been condensed in the refrigerant heat exchanger (60) and the indoor heat exchanger (31) merge together in the liquid pipe (LL), and a part thereof flows into the freezing showcase (10) while the other part flows into the outdoor unit (40).

The liquid refrigerant which has flown into the freezing showcase (10) is depressurized through the expansion valve (51), and then evaporated while exchanging heat with the refrigerant of the user-side refrigerant circuit (11) at the refrigerant heat exchanger (50). At this time, a cold heat is provided to the refrigerant of the user-side refrigerant circuit (11). The gas refrigerant which has been evaporated at the refrigerant heat exchanger (50) passes through the three-way valve (52) and then returns to the outdoor unit (40).

On the other hand, the gas refrigerant which has flown into the outdoor unit (40) is depressurized through the outdoor expansion valve (47), and then evaporated while exchanging heat with the outside air at the outdoor heat exchanger (45). The evaporated gas refrigerant passes through the outdoor four-way switching valve (43) and then merges with the gas refrigerant which has been evaporated at the refrigerant heat exchanger (50) to be taken into the outdoor compressors (41, 42). A refrigerant circulation operation as described above is performed in the heat source side refrigerant circuit (70). In this way, the indoor air conditioning unit (30) performs the heating of the inside of the room by performing a single-stage refrigerating cycle with the outdoor unit (40).

Figure 5:
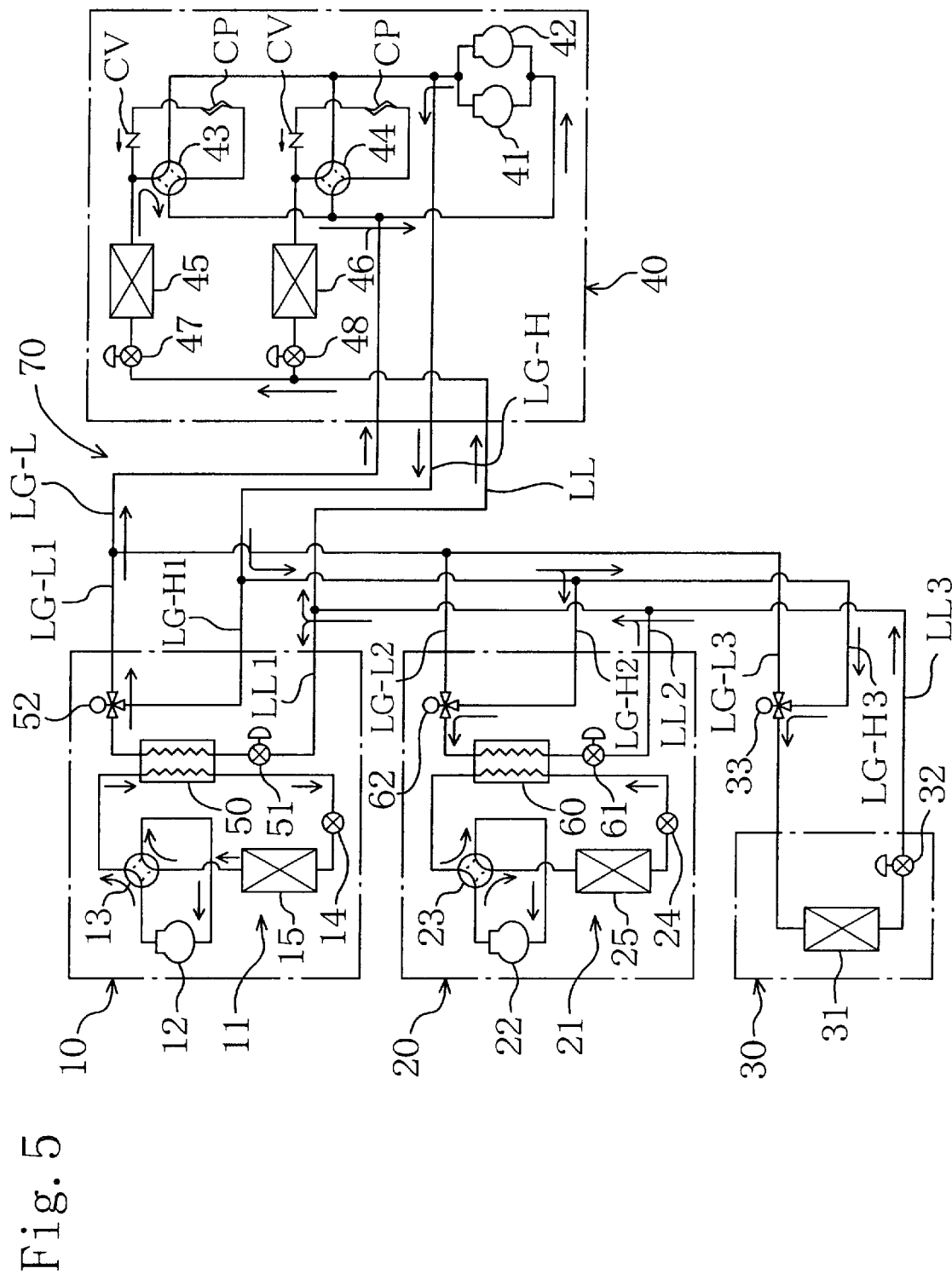
FIG. 5 is a diagram illustrating the operation of a fourth mode.

In the user-side refrigerant circuit (21) of the refrigerated showcase (20), the refrigerant circulates as indicated by an arrow in FIG. 5, thereby melting the frost on the showcase heat exchanger (25) as in the operation in the second mode described above.

In the user-side refrigerant circuit (11) of the freezing showcase (10), the refrigerant circulates as indicated by an arrow in FIG. 5, thereby obtaining a cold heat of a relatively low temperature as in the operation in the first mode described above.

This is the operation in the fourth mode. In the present operation in the fourth mode, the cold heat obtained in the refrigerated showcase (20) and the indoor air conditioning unit (30) is utilized for the cooling in the freezing showcase (10). Thus, it is not necessary to exchange all the heat between the user-side units (10, 20, 30) and the outdoor heat exchangers (45, 46). Therefore, it is possible to suppress the capacity of the outdoor compressors (41, 42) as in the operation in the third mode described above.

Operation in Fifth Mode

During operation in the fifth mode, a cold heat obtained at the refrigerant heat exchanger (50, 60) of the showcase (10, 20) is carried to the indoor heat exchanger (31) through a refrigerant circulation operation in the heat source side refrigerant circuit (70). Thus, the cooling of the inside of the room is performed.

Moreover, in each showcase (10, 20), a hot heat obtained at the refrigerant heat exchanger (50, 60) is carried to the showcase heat exchanger (15, 25) through a refrigerant circulation operation in the user-side refrigerant circuit (11, 21), thereby melting the frost on the showcase heat exchanger (15, 25). The operation in the fifth mode will now be described in greater detail.

In the following description, a case where the amount of cold heat obtained at the refrigerant heat exchanger (50, 60) and the amount of heat absorption at the indoor heat exchanger (31) are substantially equal to each other will be described. In other words, a state where the amount of heat gain/loss is balanced between the refrigerant heat exchanger (50, 60) and the indoor heat exchanger (31) will be described. Accordingly, the present operation is performed while the outdoor heat exchangers (45, 46) are not used, with one compressor (42) being turned off.

During operation in the fifth mode, the four-way switching valves (13, 23) of the respective showcases (10, 20) are each in a state as indicated by a broken line in the figure. The three-way valves (52, 62) of the respective showcases (10, 20) are each in a switched state such that the gas side of the refrigerant heat exchanger (50, 60) is connected to the discharge side of the outdoor compressors (41, 42) via the high pressure gas pipe (LG-H).

The three-way valve (33) which is coupled to the indoor air conditioning unit (30) is in a switched state such that the gas side of the indoor heat exchanger (31) is communicated to the suction side of the outdoor compressors (41, 42) via the low pressure gas pipe (LG-L). Moreover, the outdoor expansion valves (47, 48) of the outdoor unit (40) are closed, and the other expansion valves (14, 24, 32, 51, 61) are each adjusted to a predetermined opening.

In this state, the compressors (12, 22, 41) are driven. As indicated by an arrow in FIG. 6, in the heat source side refrigerant circuit (70), the refrigerant discharged from the outdoor compressor (41) flows into the showcase (10, 20) via the branch pipes (LG-H1, LG-H2) of the high pressure gas pipe (LG-H). The gas refrigerant which has flown into the showcases (10, 20) flows into the refrigerant heat exchanger (50, 60) via the three-way valve (52, 62), and is condensed while exchanging heat with the refrigerant of the user-side refrigerant circuit (11, 21) at the refrigerant heat exchanger (50, 60). At this time, a hot heat is provided to the refrigerant of the user-side refrigerant circuit (11, 21). These liquid refrigerants which have been condensed at the refrigerant heat exchangers (50, 60) merge together in the liquid pipe (LL), and flow into the indoor air conditioning unit (30) via the branch pipe (LL3) of the liquid pipe (LL).

The liquid refrigerant which has flown into the indoor air conditioning unit (30) is depressurized through the expansion valve (32), and evaporated while exchanging heat with the room air at the indoor heat exchanger (31). At this time, a cold heat is provided to the room air.

A refrigerant circulation operation as described above is performed in the heat source side refrigerant circuit (70). In this way, the indoor air conditioning unit (30) performs the cooling of the inside of the room by performing a single-stage refrigerating cycle with the outdoor unit (40).

Figure 6:
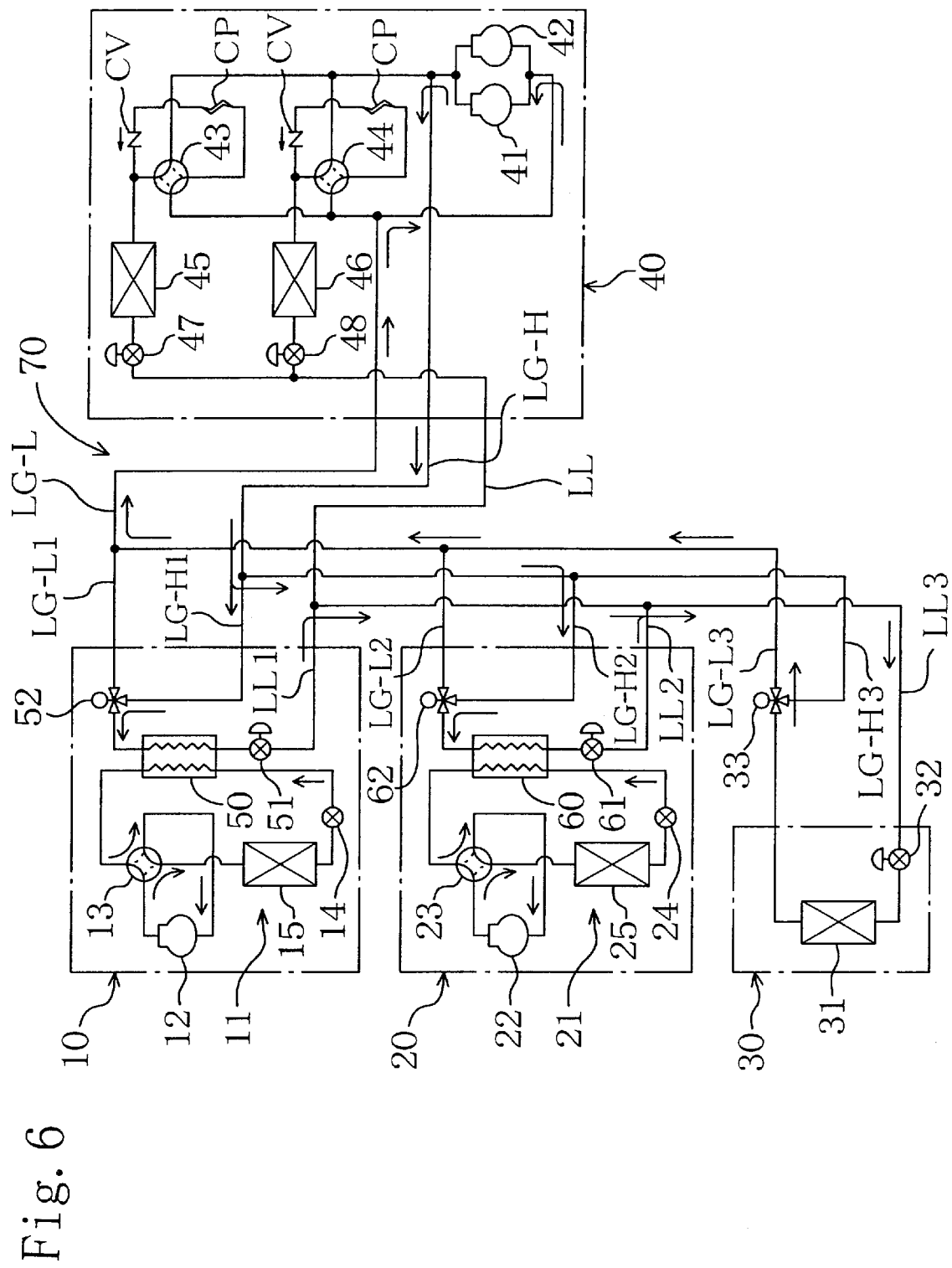
FIG. 6 is a diagram illustrating the operation of a fifth mode.

In the user-side refrigerant circuit (11, 21) of each showcase (10, 20), the refrigerant circulates as indicated by an arrow in FIG. 6, thereby melting the frost on the showcase heat exchanger (15, 25) as in the operation in the second mode described above.

This is the operation in the fifth mode. In the present operation in the fifth mode, the amount of heat gain/loss is balanced between the refrigerant heat exchanger (50, 60) and the indoor heat exchanger (31). Therefore, even with one compressor (42) being turned off, it is possible to provide the cooling of the inside of the room and the defrosting of the showcase heat exchanger (15, 25). As a result, the input power can be reduced, whereby it is possible to provide a reduction in the running cost.

Operation in Sixth Mode

During operation in the sixth mode, a cold heat obtained at the indoor heat exchanger (31) from the cooling of the inside of the room is carried to the refrigerant heat exchanger (50, 60) of the showcase (10, 20) through a refrigerant circulation operation in the heat source side refrigerant circuit (70).

Moreover, in each showcase (10, 20), a cold heat obtained at the refrigerant heat exchanger (50, 60) is carried to the showcase heat exchanger (15, 25) through a refrigerant circulation operation in the user-side refrigerant circuit (11, 21), thereby cooling the showcase heat exchanger (15, 25). The operation in the sixth mode will now be described in greater detail.

In the following description, a case where the amount of heat radiation at the indoor heat exchanger (31) and the amount of heat absorption at the refrigerant heat exchanger (50, 60) are substantially equal to each other will be described. In other words, a state where the amount of heat gain/loss is balanced between the refrigerant heat exchanger (50, 60) and the indoor heat exchanger (31) will be described. Accordingly, the present operation is also performed while the outdoor heat exchangers (45, 46) are not used, with one compressor (42) being turned off.

During operation in the sixth mode, the four-way switching valves (13, 23) of the respective showcases (10, 20) are each in a state as indicated by a solid line in the figure. The three-way valves (52, 62) of the respective showcases (10, 20) are each in a switched state such that the gas side of the refrigerant heat exchanger (50, 60) is connected to the suction side of the outdoor compressors (41, 42) via the low pressure gas pipe (LG-L).

The three-way valve (33) which is coupled to the indoor air conditioning unit (30) is in a switched state such that the gas side of the indoor heat exchanger (31) is communicated to the discharge side of the outdoor compressors (41, 42) via the high pressure gas pipe (LG-H). Moreover, the outdoor expansion valves (47, 48) of the outdoor unit (40) are both closed, and the other expansion valves (14, 24, 32, 51, 61) are each adjusted to a predetermined opening.

In this state, the compressors (12, 22, 41) are driven. As indicated by an arrow in FIG. 7, in the heat source side refrigerant circuit (70), the refrigerant discharged from the outdoor compressor (41) flows into the indoor air conditioning unit (30) via the branch pipe (LG-H3) of the high pressure gas pipe (LG-H). The gas refrigerant which has flown into the indoor air conditioning unit (30) flows into the indoor heat exchanger (31), and is condensed while exchanging heat with the room air at the indoor heat exchanger (31). At this time, a hot heat is provided to the room air.

The liquid refrigerant which has been condensed at the indoor heat exchanger (31) flows into the showcase (10, 20) via the branch pipes (LL1, LL2) of the liquid pipe (LL). The liquid refrigerant which has flown into the showcase (10, 20) is depressurized through the expansion valves (51, 61), and then evaporated while exchanging heat with the refrigerant of the user-side refrigerant circuit (11, 21) at the refrigerant heat exchanger (50, 60). At this time, a cold heat is provided to the refrigerant of the user-side refrigerant circuit (11, 21). The gas refrigerants which have been evaporated at the refrigerant heat exchangers (50, 60) pass through the three-way valves (52, 62) and then merge together. The merged gas refrigerant is taken into the outdoor compressors (41, 42) via the low pressure gas pipe (LG-L). A refrigerant circulating operation as described above is performed in the heat source side refrigerant circuit (70). In this way, the indoor air conditioning unit (30) performs the heating of the inside of the room by performing a single-stage refrigerating cycle with the outdoor unit (40).

Figure 7:
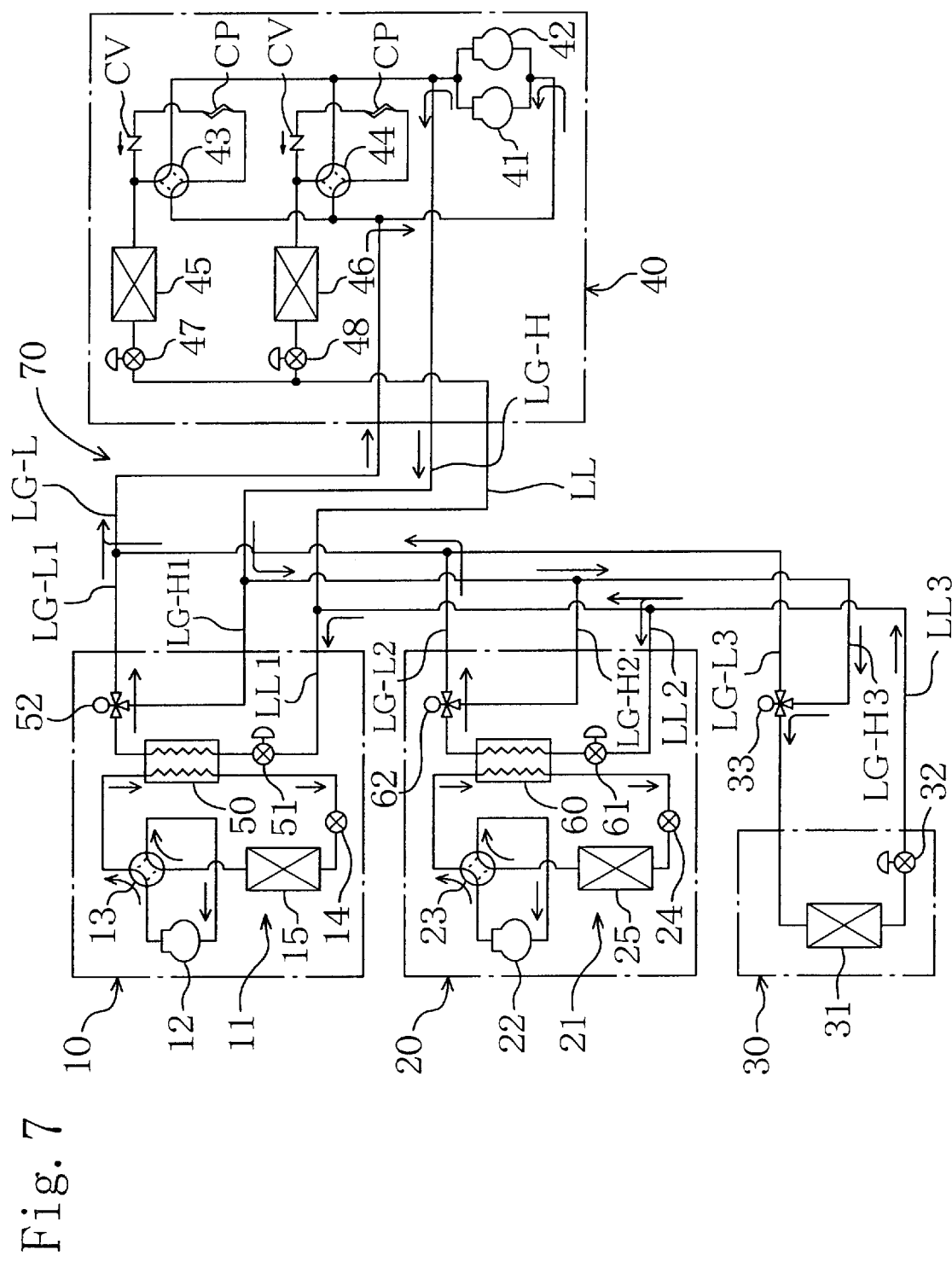
FIG. 7 is a diagram illustrating the operation of a sixth mode.

In the user-side refrigerant circuit (11, 21) of each showcase (10, 20), the refrigerant circulates as indicated by an arrow in FIG. 7, thereby obtaining a cold heat of a relatively low temperature as in the operation in the first mode described above.

This is the operation in the sixth mode. Also in the present operation in the sixth mode, the amount of heat gain/loss is balanced between the refrigerant heat exchanger (50, 60) and the indoor heat exchanger (31). Therefore, even with one compressor (42) being turned off, it is possible to provide the cooling of the inside of the room and the defrosting of the showcase heat exchanger (15, 25). As a result, the input power can be reduced, whereby it is possible to provide a reduction in the running cost.

INDUSTRIAL APPLICABILITY

As described above, the refrigeration system of the present invention is useful for cooling showcases, etc., and is particularly suitable for a case where the cooling of the showcases and the air conditioning of the inside of the room are performed at the same time.

What is claimed is:

1. A refrigeration system, comprising a heat source side refrigerant circuit (70) having a plurality of refrigerant heat exchangers (50, 60), and a plurality of user-side refrigerant circuits (11, 21) corresponding to the respective refrigerant heat exchangers (50, 60), wherein:

the heat source side refrigerant circuit (70) comprises compressors (41, 42), first switching means (43, 44), and heat source side heat exchangers (45, 46) which are respectively switched by the first switching means (43, 44) between a state where they are communicated to a discharge side of the compressors (41, 42) and another state where they are communicated to a suction side thereof;

one end of a high pressure gas pipe (LG-H) is connected between the discharge side of the compressors (41, 42) and the first switching means (43, 44), one end of a low pressure gas pipe (LG-L) is connected between the suction side of the compressors (41, 42) and the first switching means (43, 44), and one end of a liquid pipe (LL) is connected to a liquid side of the heat source side heat exchangers (45, 46);

the pipes (LG-H, LG-L, LL) at the other end are branched into branch pipes (LG-H1, LG-H2, LG-L1, LG-L2, LL1, LL2), respectively;

one end side of the refrigerant heat exchanger (50) of one of the plurality of user-side refrigerant circuits (11, 21) is connected to one of the branch pipes (LL1, LL2) of the liquid pipe (LL), and one end side of the refrigerant heat exchanger (60) of the other one of the plurality of user-side refrigerant circuits (11, 21) is connected to the other one of the branch pipes (LL1, LL2) of the liquid pipe (LL);

the other end side of the one refrigerant heat exchanger (50) is configured so as to be switched by second switching means (52) between a state where it is communicated to one of the branch pipes (LG-H1, LG-H2) of the high pressure gas pipe (LG-H) and another state where it is communicated to one of the branch pipes (LG-L1, LG-L2) of the low pressure gas pipe (LG-L); and the other end side of the other one refrigerant heat exchanger (60) is configured so as to be switched by second switching means (62) between a state where it is communicated to the other one of the branch pipes (LG-H1, LG-H2) of the high pressure gas pipe (LG-H) and another state where it is communicated to the other one of the branch pipes (LG-L1, LG-L2) of the low pressure gas pipe (LG-L); and the heat source side refrigerant circuit (70) and the user-side refrigerant circuits (11, 21) are configured so that a heat source side refrigerant circulating through the heat source side refrigerant circuit (70) and user-side refrigerants circulating through the user-side refrigerant circuits (11, 21) exchange heat with each other at the refrigerant heat exchangers (50, 60), thereby performing a multi-stage cascade refrigerating cycle.

2. A refrigeration system, comprising a heat source side refrigerant circuit (70) having a refrigerant heat exchanger (50) and a user-side refrigerant circuit (11), wherein:

the heat source side refrigerant circuit (70) comprises compressors (41, 42), first switching means (43, 44), and heat source side heat exchangers (45, 46) which are respectively switched by the first switching means (43, 44) between a state where they are communicated to a discharge side of the compressors (41, 42) and another state where they are communicated to an suction side thereof;

one end of a high pressure gas pipe (LG-H) is connected between the discharge side of the compressors (41, 42) and the first switching means (43, 44), one end of a low pressure gas pipe (LG-L) is connected between the suction side of the compressors (41, 42) and the first switching means (43, 44), and one end of a liquid pipe (LL) is connected to a liquid side of the heat source side heat exchangers (45, 46);

the pipes (LG-H, LG-L, LL) at the other end are branched into branch pipes (LG-H1, LG-H3, LG-L1, LG-L3, LL1, LL3), respectively;

one end side of the refrigerant heat exchanger (50) is connected to one of the branch pipes (LL1, LL3) of the liquid pipe (LL), whereas the other end side of the refrigerant heat exchanger (50) is configured so as to be switched by second switching means (52) between a state where it is communicated to one of the branch pipes (LG-H1, LG-H3) of the high pressure gas pipe (LG-H) and another state where it is communicated to one of the branch pipes (LG-L1, LG-L3) of the low pressure gas pipe (LG-L);

the heat source side refrigerant circuit (70) and the user-side refrigerant circuit (11) are configured so that a heat source side refrigerant circulating through the heat source side refrigerant circuit (70) and a user-side refrigerant circulating through the user-side refrigerant circuit (11) exchange heat with each other at the refrigerant heat exchanger (50), thereby performing a multi-stage cascade refrigerating cycle; and the refrigeration system comprises another user-side heat exchanger (31) in which one end side thereof is connected to the other one of the branch pipes (LL1, LL3) of the liquid pipe (LL) and the other end side thereof is switched by third switching means (33) between a state where it is communicated to the other one of the branch pipes (LG-H1, LG-H3) of the high pressure gas pipe (LG-H) and another state where it is communicated to the other one of the branch pipes (LG-L1, LG-L3) of the low pressure gas pipe (LG-L).

3. A refrigeration system according to claim 1 or 2, wherein:

the second switching means (52, 62) are three-way valves (52, 62) which are respectively connected to the branch pipes (LG-H1, LG-H2) of the high pressure gas pipe (LG-H), the branch pipes (LG-L1, LG-L2) of the low pressure gas pipe (LG-L) and a gas side of the refrigerant heat exchangers (50, 60).

4. A refrigeration system according to claim 2, wherein:

the third switching means (33) is a three-way valve (33) which is connected to the branch pipe (LG-H3) of the high pressure gas pipe (LG-H), the branch pipe (LG-L3) of the low pressure gas pipe (LG-L) and a gas side of the user-side heat exchanger (31).

5. A refrigeration system according to claim 2, wherein:

the user-side refrigerant circuit (11) is provided in a food display showcase (10) provided in a supermarket and is configured so as to perform a vapor compression type refrigerating cycle to cool a space in the showcase with a refrigerant which is evaporated at a showcase heat exchanger (15); and the other user-side heat exchanger (31) is a heat exchanger (31) for air conditioning of an inside of the supermarket.

6. A refrigeration system according to claim 5, wherein:

the second switching means (52) communicates the other end side of the refrigerant heat exchanger (50) to the branch pipe (LG-H1) of the high pressure gas pipe (LG-H) when melting a frost on the showcase heat exchanger (15).

7. A refrigeration system, comprising:

a heat source side unit (40);

a plurality of user-side units (10, 20) which are connected to the heat source side unit (40) by a high pressure gas pipe (LG-H), a low pressure gas pipe (LG-L) and a liquid pipe (LL); and switching means (43, 44, 52, 62) for switching a flow of refrigerant so as to supply a gas refrigerant from the heat source side unit (40) or a gas refrigerant from the user-side unit (10, 20) requiring a cold heat to the user-side unit (10, 20) requiring a hot heat through the high pressure gas pipe (LG-H), and to supply a liquid refrigerant from the heat source side unit (40) or a liquid refrigerant from the user-side unit (10, 20) requiring a hot heat to the user-side unit (10, 20) requiring a cold heat through the liquid pipe (LL), wherein:

the user-side units (10, 20) include circulation circuits (11, 21) through which a user-side refrigerant circulates for exchanging heat with a heat source side refrigerant supplied from the heat source side unit (40) or another one of the user-side units (10, 20), so as to perform a multi-stage cascade refrigerating cycle with the heat source side unit (40).

8. A refrigeration system, comprising:

a heat source side unit (40);

a plurality of user-side units (10, 20, 30) which are connected to the heat source side unit (40) via a high pressure gas pipe (LG-H), a low pressure gas pipe (LG-L) and a liquid pipe (LL); and switching means (43, 44, 52, 62, 33) for switching a flow of refrigerant so as to supply a gas refrigerant from the heat source side unit (40) or a gas refrigerant from the user-side unit (10, 20) requiring a cold heat to the user-side unit (10, 20, 30) requiring a hot heat through the high pressure gas pipe (LG-H), and to supply a liquid refrigerant from the heat source side unit (40) or a liquid refrigerant from the user-side unit (10, 20) requiring a hot heat to the user-side unit (10, 20, 30) requiring a cold heat through the liquid pipe (LL), wherein:

at least one user-side unit (10, 20) among the plurality of user-side units (10, 20, 30) includes a circulation circuit (11, 21) through which a user-side refrigerant circulates for exchanging heat with a heat source side refrigerant supplied from the heat source side unit (40) or another one of the user-side units (10, 20, 30), so as to perform a multi-stage cascade refrigerating cycle with the heat source side unit (40).

* * * * *

UNITED STATES PATENT AND TRADEMARK OFFICE
CERTIFICATE OF CORRECTION

PATENT NO.   : 6,393,858 B1
DATED        : May 28, 2002
INVENTOR(S)  : Takenori Mezaki and Akitoshi Ueno It is certified that error appears in the above-identified patent and that said Letters Patent is hereby corrected as shown below:

<u>Title page,</u>
Item [56], References Cited, FOREIGN PATENT DOCUMENTS, please add
-- JP 10-209103  July 24, 1998 --

Signed and Sealed this

Seventh Day of October, 2003

JAMES E. ROGAN
*Director of the United States Patent and Trademark Office*